March 3, 1959   J. ROCCO   2,875,560
TOOL HOLDER
Filed Feb. 20, 1956

INVENTOR.
JOSEPH ROCCO
BY
Bates Peare & McBean
ATTORNEYS

United States Patent Office 2,875,560
Patented Mar. 3, 1959

2,875,560

TOOL HOLDER

Joseph Rocco, Cleveland, Ohio

Application February 20, 1956, Serial No. 566,455

3 Claims. (Cl. 51—232)

This invention relates to tool fixtures and more particularly to a tool holder utilized to facilitate the sharpening of tools having one or more spiral cutting edges.

In the sharpening of tools having spiral cutting edges such as drills, reamers, end mills and the like, it is not only necessary to maintain accurate alignment of the tool with the grinder while the tool is being ground, but it is highly essential that provision be made for rotation of the tool as it is passed along the grinding wheel during the sharpening process. One of the fixtures heretofore used to perform this sharpening operation was constructed in accordance with United States Patent No. 2,035,163, which issued March 24, 1936 on an application filed by Karl W. Holmberg. That fixture operated on the principle of a tool holder slidably mounted in a transversely tiltable head. Sharpening of the tool was effected by drawing the tool in one direction across the face of the grinding wheel. A guide finger was employed to hold the tool in cooperative relationship with the grinding wheel during the sharpening operation. On the return stroke, the head was tilted so as to free the tool from contact with the grinding wheel. Thus the tool was sharpened only when it was moved in one direction across the face of the grinding wheel. This procedure requires a number of passes of the tool across the grinding wheel to sharpen the tool properly. In addition to the excessive time involved for sharpening the tool, the fixture was expensive to manufacture and required the services of a skilled operator.

Another objection is the fact that the fixture cannot be used for taking off a heavy cut on the tool without making the tool tend to rise off the guide finger. It is important to keep the tool in contact with the guide finger in order to assure accuracy in the angle of the grind.

A further objection to the aforesaid fixture is that it cannot be used for cylindrical grinding since there is no means by which the tool can be rotated at high speeds.

It is an object of the invention to provide a fixture for the sharpening of tools having spiral cutting edges which can be used with standard equipment on grinding machines and which will permit the tool to be ground while it is being passed longitudinally along the face of the grinding wheel in either direction, thereby enabling the sharpening of the tool on both the feed and return strokes and substantially decreasing the time required to sharpen the tool.

Another object of the invention is to provide a fixture for the sharpening of tools having spiral cutting edges by means of which the tool can be rotated at high speeds and thereby be ground cylindrically.

A further object of the invention is to provide a tool holder utilized for the sharpening of tools having spiral cutting edges that is simple in structure, easy to use and inexpensive to manufacture.

Briefly, the foregoing objects are accomplished by a tool holder mechanism which includes a tool holder support having a tool holder mounted therein. The tool holder includes a spindle with a chuck mounted on one end thereof. The mechanism is constructed to permit the chuck to be freely rotatable with respect to the tool holder support. This is achieved by providing a plurality of ball bearings in the mechanism between the tool holder support and the chuck. In one form of the invention, illustrated in the drawings, there is provided a tool holder having a spindle in which a chuck is mounted for rotation with respect to the spindle. The spindle comprises a shaft having an enlarged cylindrical head at one end, and the head has an axial bore in which a plurality of ball bearing rings are axially mounted by a pressed fit. The chuck has a rear shank of reduced diameter that is adapted to be journaled in the ball bearing rings in the spindle head, and is held in the ball bearing rings by a pressed fit. The spindle may be secured to a tool holder support by any suitable means. Thus a tool mounted in the chuck is free to rotate with respect to the tool holder support and is held in accurate alignment at all times during the grinding process by the ball bearing rings.

The tool holder support, with the tool holder mounted therein, may be mounted on a base adjacent a grinder in a manner allowing the tool holder to be longitudinally adjustable with respect to the grinder, thus enabling the tool to be passed back and forth over the face of the grinding wheel for the sharpening operation. The grinder may be mounted on a base separate from the tool holder support base in a manner allowing the grinder to be adjustable transversely as well as vertically with respect to the tool holder. This structure permits the grinder to be positioned in cooperative relationship with the tool for grinding purposes. A tool guide including a guide finger adapted for insertion into the flute of the tool may be disposed on another support for retaining the spiral cutting edges of the tool that is to be sharpened in cooperative relationship with the grinding wheel during the grinding operation. The chuck may have a V-groove therein adapted to receive a motor driven V-belt, thus enabling high speed rotation of the tool holder for cylindrical grinding purposes.

A particular advantage of the invention is that a tool can be sharpened in about one third of the time required for previously known fixtures, with a substantial reduction in the wear and tear on the grinding wheel. In addition, the fixtures can be manufactured for approximately one third of the cost of previously known fixtures.

Referring to the drawings.

One of the difficulties encountered in sharpening spiral fluted tools such as drills, reamers, end mills, and the like, is to provide a tool holder of simple construction that can be used with standard equipment on grinding machines. The present invention overcomes the aforementioned difficulty by the provision of tool holder having a chuck freely rotatable with respect to the tool holder support.

Figure 2:
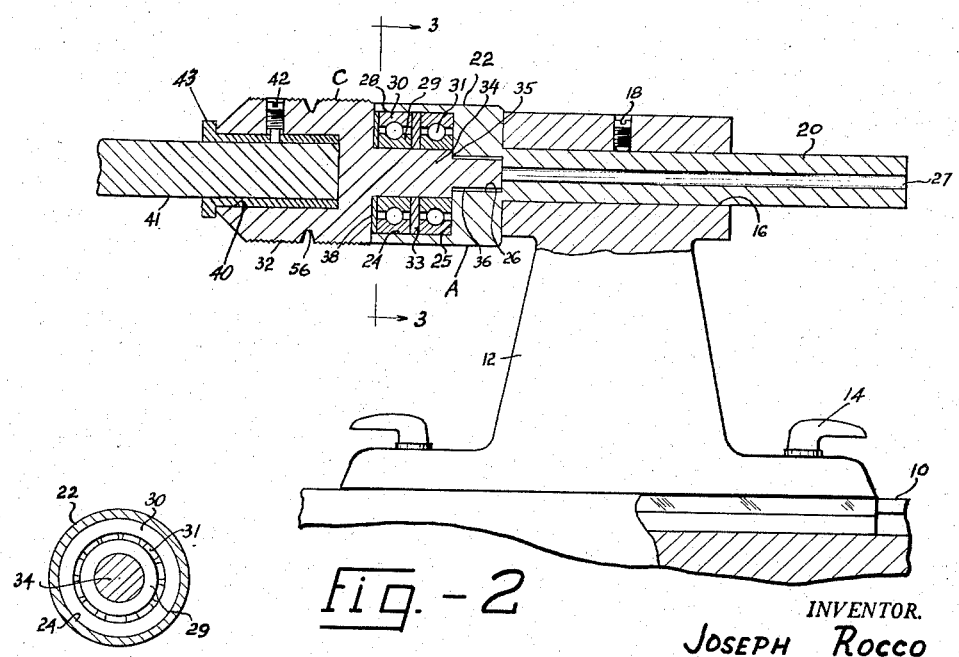
Fig. 2 is an enlarged, longitudinal, front elevational view partly in section, of the tool holder shown in Fig. 1, with a bushing inserted in the chuck.
Figure 3:
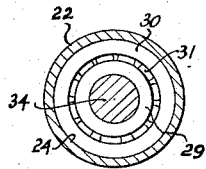
Fig. 3 is a vertical sectional view taken along line 3—3 of Fig. 2.

In one form of the invention, there is shown a base or bed plate 10 on which a support member or tool holder support 12 is adjustably mounted in a longitudinal track in the bed plate by the hand bolts 14. The base 10 may be a part of an ordinary milling or grinding machine adapted for longitudinal movement with respect to an adjacent grinder, as will be hereinafter described. Mounted in the bore 16 of the support 12 and secured therein by the set screw 18 is a tool holder A. The tool holder comprises a spindle 20 having a cylindrical head 22 at one end thereof. The head 22 has a stepped bore which includes a main axial bore 24 which forms into a restricted portion 26, and an additionally restricted portion or knock-out bore 27. The shoulders 25 are formed at the juncture of the bore 24 and its restricted portion 26. Telescoped axially into the bore 24 by means of a pressed fit are the ball bearing rings or units 28. Each ball bearing unit comprises an inner race 29 (Figs. 2 and 3), an outer race 30 and the ball bearings 31 disposed therebetween, with the outer race 30 being disposed in the spindle bore 24 by a pressed fit as aforementioned. In the present instance, two bearing rings are employed with a spacer 33 being disposed between them.

The tool holder includes also the chuck C which comprises a cylindrical head 32, which forms into a rear spindle or shank 34 having a restricted portion 36. The shoulders 35 are formed at the juncture of shank 34 and its restricted portion 36. The shank 34 is telescoped into the ball bearing rings 28 in the spindle head 22 by a pressed fit, with the restricted portion 36 of the shank being disposed in the restricted portion 26 of bore 24. Axial movement of the shank 34 into the spindle 20 is limited by the engagement of the chuck shank shoulders 35 with spindle head shoulders 25. A washer 38 is disposed between the chuck head 32 and the ball bearing units 28. The chuck head 32 has an axial bore 40 for receiving the shank end of a tool 41 (or a sleeve or bushing 43 with a tool therein) for sharpening purposes. The tool (or bushing) may be secured in the bore by means of the set screw 42.

When the spindle 20 (with the chuck C rotatively secured thereto) is secured to the support member 12 (by the set screw 18), the spindle and the support together, in effect, form an integral supporting means for the chuck, with the chuck being freely rotatable with respect to the supporting means by reason of the bearings 28 therebetween.

The aforementioned tight fitting engagement that the ball bearing units have with the chuck and with the spindle not only serve to keep the chuck (and tool) in proper alignment, but also serve as a means for holding the chuck against axial movement with reference to the support 12.

The tool holder is disassembled by inserting a rod through the knock-out bore 27 until it contacts the restricted portion 36 of the chuck shank 34. The rod is then pounded firmly to the left (Fig. 2) thus dislodging the chuck from its pressed fit position in the ball bearing rings.

Figure 1:
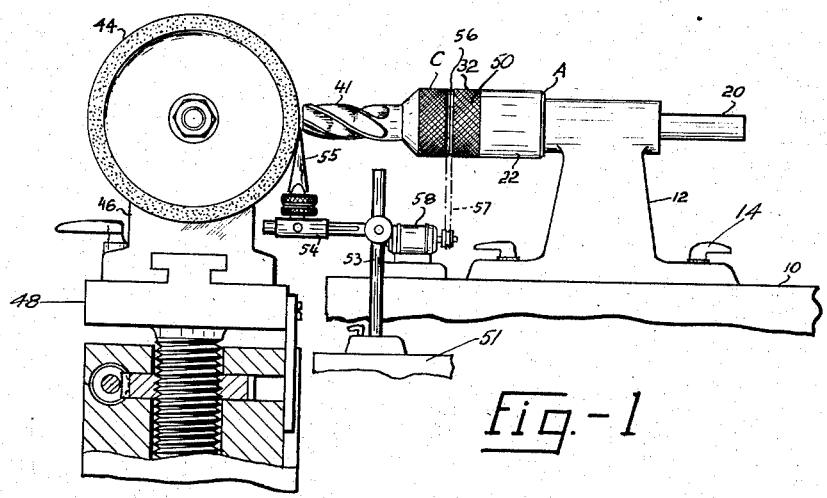
Fig. 1 is a front elevational view of a tool holder in accordance with the invention.

In practice, the shank end of a tool 41 (or a bushing 43 with a tool therein), is mounted in the chuck bore 40 and tightened therein by the set screw 42. The tool is sharpened by the grinding wheel 44 (Fig. 1), which may be driven by an electric motor (not shown) and carried by a transversely adjustable driving base 46, which may be suitably secured to a vertically adjustable support 48. The grinding wheel 44 is thus adjustable vertically as well as transversely (with respect to the tool holder), thereby enabling the grinder to be brought into exact grinding relationship with the tool. The tool holder base 10 may be a part of an ordinary milling or grinding machine adapted for longitudinal movement with respect to the grinder, thus enabling the tool 41 to be passed back and forth along the grinder for grinding purposes. Mounted on a separate base 51 below the tool 41 is a universally adjustable guide finger assembly including the adjustable mounting arms 53 and 54, and the guide finger 55, which is adapted to engage the flute of the tool to keep the cutting edge thereof in exact grinding relationship with the grinding wheel during the grinding operation. In other words, the underneath side of the tool flute is always constrained to ride upon the upper point of the guide finger 55 as the operator passes the tool back and forth across the face of the grinding wheel. The outside surface of the chuck 32 is serrated as at 50 to enable the operator to hold the chuck easily during this operation. With this construction, the time required to sharpen the tool is substantially reduced, since the tool may be ground on both the feed and return strokes.

For cylindrical grinding purposes, the chuck 32 is provided with a V-groove 56, for receiving a V-belt 57 driven by a motor 58, which may be mounted on the tool holder bed plate 10. Thus the invention is not only adapted for the sharpening of the cutting edges of spiral fluted tools, but is also adapted for high speed cylindrical grinding operations.

The range of the various size of tools to be ground varies from very small to very large tools and for this reason it is difficult to utilize one single spindle-chuck-bushing combination for the entire range of tools. Therefore, in this invention different size spindle-chuck-bushing combinations may be utilized.

While the invention is particularly adapted for the sharpening of tools having spiral flutes, it is to be pointed out that the invention may be utilized also to sharpen tools having straight flutes as well as spiral and, of course, may hold tools which have only end cutting edges to be sharpened.

The terms and expressions which have been employed are used as terms of description and not of limitation and there is no intention, in the use of such terms and expressions of excluding any equivalents of the features shown and described or portions thereof, but it is recognized that various modifications are possible within the scope of the invention claimed.

I claim:

1. A tool holder comprising in combination a supporting member, a chuck having a shank rotatively mounted on said member, and a plurality of ball bearing units interposed between said member and said chuck, each unit including an outer race and an inner race, at least one of the races on each unit having a press-fit engagement with said shank, and abutment means on said chuck disposed contiguously with abutment means on said supporting member for preventing relative axial movement therebetween.

2. A tool holder comprising in combination a supporting member, a chuck having a shank rotatively mounted in said member, and a plurality of ball bearing units interposed between said member and said chuck, each unit including an outer race and an inner race, said outer races having a press-fit engagement with said member, and said inner races having a press-fit engagement with said shank, and abutment means on said chuck disposed contiguously with abutment means on said supporting member for preventing relative axial movement of said chuck toward said supporting member.

3. A tool holder comprising a relatively stationary member having an axial bore therein, a pair of ball bearing units axially disposed in said bore, a chuck having a shank disposed in said units, each of said units comprising a circular inner race and a circular outer race, said outer races having a press-fit engagement with a wall of said bore, and said shank having a tight fitting engagement with said inner races, and integral abutment means on said chuck disposed contiguously with abutment means on said stationary member for preventing axial movement of said chuck and associated shank inwardly toward said stationary member, said abutment means including generally radially extending faces disposed in planes substantially perpendicular to the axis of rotation of said chuck.

References Cited in the file of this patent

UNITED STATES PATENTS

| 2,430,997 | Schmidt | Nov. 18, 1947 |
| 2,436,535 | Walther | Feb. 24, 1948 |
| 2,453,825 | Wright | Nov. 16, 1948 |
| 2,547,079 | Gerentes | Apr. 3, 1951 |
| 2,569,855 | Hertlein | Oct. 2, 1951 |

FOREIGN PATENTS

| 881,141 | Germany | June 29, 1953 |